US 6,529,258 B2

(12) United States Patent
Watanabe et al.

(10) Patent No.: US 6,529,258 B2
(45) Date of Patent: Mar. 4, 2003

(54) LIQUID CRYSTAL DISPLAY DEVICE HAVING WIRING LAYER AND SEMICONDUCTOR LAYER CROSSING EACH OTHER

(75) Inventors: Makoto Watanabe, Tokyo (JP); Fuminori Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/971,220

(22) Filed: Oct. 4, 2001

(65) Prior Publication Data

US 2002/0044120 A1 Apr. 18, 2002

(30) Foreign Application Priority Data

Oct. 18, 2000 (JP) ........................................ 2000-317554

(51) Int. Cl.[7] ............................................. G02F 1/1335
(52) U.S. Cl. ............................................ 349/143; 349/43
(58) Field of Search .............................. 349/139, 141, 349/43, 38, 39; 257/59, 72

(56) References Cited

U.S. PATENT DOCUMENTS

| 4,991,939 A | * | 2/1991 | Momose et al. | ............. 350/333 |
| 5,287,206 A | * | 2/1994 | Kanemori et al. | ............. 359/59 |
| 5,535,028 A | * | 7/1996 | Bae et al. | ....................... 359/61 |
| 5,652,633 A | * | 7/1997 | Lee | ............................. 349/42 |
| 5,929,463 A | * | 7/1999 | Stupp et al. | .................... 257/59 |
| 5,969,778 A | * | 10/1999 | Oh et al. | ........................ 349/43 |
| 6,232,620 B1 | * | 5/2001 | Katoh | ............................ 257/59 |
| 6,285,418 B1 | * | 9/2001 | Ko et al. | ........................ 349/38 |

FOREIGN PATENT DOCUMENTS

JP         2-20830       1/1990

* cited by examiner

*Primary Examiner*—James Dudek
(74) *Attorney, Agent, or Firm*—Choate, Hall & Stewart (57) ABSTRACT

Liquid crystal display device includes a lower-level layer such a scan line running in a first direction and an upper-level layer such a signal (data) line running in a second direction intersecting the first direction, these two layers crossing each other. An island region such a semiconductor layer is provided at the crossing portion of the lower-level and upper-level layers to intervene between the lower-level and upper-level layers. The island region has a first edge that extends in the first direction and a second edge that extends in the first direction and is different in coordinate in the second direction from the first edge. The upper-level layer being formed such that a pair of side edges defining the width of the upper-level layer cross respectively with the first and second edges of the island region. The island region may further have a third edge that extends in the second direction to connect the first and second edges.

20 Claims, 5 Drawing Sheets

LIQUID CRYSTAL DISPLAY DEVICE HAVING WIRING LAYER AND SEMICONDUCTOR LAYER CROSSING EACH OTHER

BACKGROUND OF THE INVENTION

1. Field of the Invention

The present invention relates to a liquid crystal display (LCD) device and, more specifically, to such an LCD device as having an upper-level pattern such as a wiring layer crossing a lower-level pattern such as a semiconductor layer.

2. Description of the Related Art

While an LCD device is classified roughly into an active type and a passive type, the active type LCD device has been recently widely employed. In the active type, an active element such as a transistor and a metal-insulator-metal (MIM) element is used as a switching element for driving an liquid crystal cell. As such a transistor, a thin film transistor (TFT) of the inverted staggered type is usually used.

The TFT of the inverted staggered type includes basically a gate electrode formed on a substrate such as glass, a semiconductor layer formed on a gate insulating film covering the gate electrode, and source and drain electrodes which are in an ohmic contact with the semiconductor layer. The source (drain) electrode is connected to a signal line to which image data is supplied, and a drain (source) electrode is connected to a pixel electrode of a pixel (picture element). The gate electrode is connected to a scan line to which a scan signal is supplied to render the TFT conductive and non-conductive.

As another TFT, a staggered type is known in which a semiconductor layer and source/drain electrodes are formed in lower level than a gate insulating film, and a gate electrode is formed on the gate insulating layer.

In case of performing a display in X and Y axes plane, the liquid crystal pixels and thus the switching transistors are arranged in a matrix. Therefore, a plurality of scan lines are formed in parallel to each other in the X direction, and a plurality of signal lines are formed in parallel to each other in the Y direction, each TFT being thus disposed on the different one of the intersections of the scan and signal lines. As a result, the scan and signal lines cross to each other with an electrical isolation between the scan and signal lines. In the LCD device employing the inverted staggered type, the scan and signal lines are formed respectively as a lower-level wiring layer and an upper-level wiring layer. In the staggered type, on the other hand, the scan and signal lines are formed respectively as an upper-level wiring layer and a lower-level wiring layer. The electrical isolation between the scan and signal lines is attained by utilizing the gate insulating layer, as is apparent from the above. In order to avoid the short-circuit between the crossing lines that may occur due to pinhole(s) formed in the gate insulating layer, an island semiconductor layer, which is patterned simultaneously with forming the semiconductor layer functioning as the channel region of the TFT, intervenes between the scan and signal lines.

Thus, the upper-level wiring layer crosses the edge of the lower-level pattern such as the island semiconductor layer. The upper-level wiring layer is formed by depositing a wiring material over the entire surface of the substrate and then patterning the wiring material by selective-etching process using the photolithography. At this time, due to the lowering in adhesive strength of the wiring material to the lower-level pattern that are caused by the step at the edge of the lower-level pattern, the etchant used in the selective-etching process soaks between the lower-level pattern and the wiring material along the edge of the lower-level pattern to remove desired portions of the wiring material. At the worst case, the upper-level wiring layer is broken down. Such phenomena may takes place at the crossing portions of the source/drain electrodes and the semiconductor channel layer of the TFT.

In order to solve the above problems, therefore, the Japanese Laid-Open (Kokai) Patent Publication Hei 2-20830 discloses providing, in a plane view, at least one protrusion and/or indentation at the edge of the crossing portion of the lower-level pattern to the upper-level portion. This countermeasure is to make large the effective length of the crossing edge of the lower-level pattern to the upper-level pattern by the protrusion and/or indentation. With such construction, even if the etchant soaks between the upper-level and lower-level pattern, the breaking-down of the upper-level pattern is prevented.

Figures 4, 5:
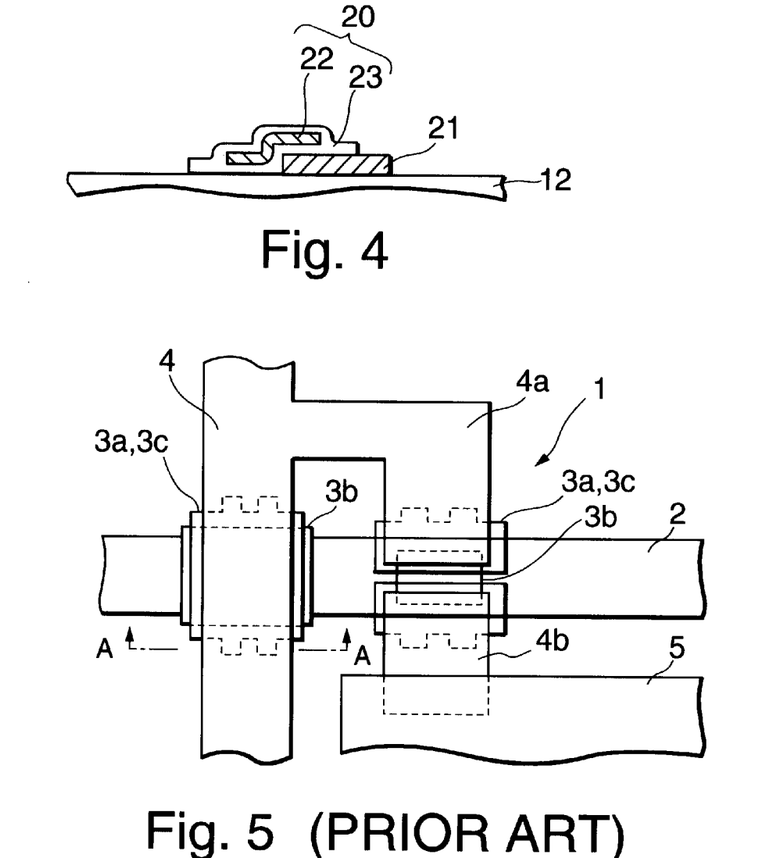
FIG. 4 is a cross-sectional view along the line C—C of FIG. 3.
FIG. 5 is a plane view illustrative of a part of an LCD device according to the prior art.

More specifically, as the partial plane view of the LCD device according to the above publication is shown in FIG. 5, this device employs the TFT 1 of the inverted staggered type. This TFT 1 thus includes scan wiring layer 2, an intrinsic amorphous silicon (a-Si) layer 3a as a semiconductor layer that is formed on a gate insulating layer covering the scan line 2, a protective layer 3b formed thereover to protect the channel region of the a-Si layer 3, n+ (high-conductivity) amorphous silicon (n-a-Si) layers 3c formed on the a-Si layer 3 to present an ohmic contact with electrodes, source and drain electrodes 4a and 4b formed on the n-a-Si layers 3c, and an pixel (picture element) electrode 5 connected to the electrode 4b. In this device, apart of the scan line also functions as agate electrode, and the electrode 4a is branched from a signal line 4. At the crossing portion of the scan and signal lines 2 and 4, for the reasons described above, there are provided in addition to the gate insulating film, an island a-Si layer 3a, an island n-a-Si layer 3c and a channel protective layer 3b.

In order to prevent the breaking-down of the signal line 4 (the upper pattern), each of the a-Si layers 3a and 3c is patterned such that its edge, over which the signal line 4 or the electrodes 4a and 4b cross, becomes concavo-convex in plane view by providing two protrusions. By this patterning, the length of the crossing edge line of each a-Si layer 3 to the wiring line 4 or the electrodes 4a and 4b is made larger. As a result, even if the etchant for selectively patterning the wiring line 4 and the electrodes 4a and 4b soaks along the such crossing edge line, the braking-down of the line 4 and the electrodes 4a and 4b is prevented.

The LCD display is requested not only solving the problems in its manufacturing process but also enhancing its display quality. One of the issues to be enhanced in the display quality is the so-called aperture ratio. That is, it is requested to increase the aperture ratio. This request is achieved by make the areas of the light impermissible layers as small as possible. To this end, in the LCD device shown in FIG. 5, the wiring layer such as the signal line 4 and the scan line 2 is required to be made small in its width to thereby increase the area of the pixel electrode 5 surrounded by these wiring layers 4 and 2.

It has been, however, recognized by the inventors that the following serious problems caused by lowering the width of the signal line 4 (upper wiring layer) of the LCD device shown in FIG. 5 for the purpose of increasing the aperture ratio. Specifically, the signal line 4 is patterned by the selective-etching method performed on the wiring material layer formed over the entire surface of the substrate, and to do the selective-etching, it is required to form a mask layer on the wiring material. The mask layer is usually formed by projecting a wiring pattern, which is provided on a photo-mask, on a photoresist layer formed on the wiring material layer. At this time, it is unavoidable that the deviation in alignment between the photo-mask and the LCD substrate occurs. As a result, the signal line 4 is not formed in the designed center location, but is actually formed with some deviation in the up-and-down and/or left-and right direction from the designed center location. For this reason, if the width of the signal line 4 is made small for the high aperture ratio, such a case may occur that one of the side edges defining the width of the signal line 4 (in FIG. 5, the side edge of the line 4 in the Y axis direction) is substantively coincident in plane view with the edge of one protrusion of the a-Si layer 3 which edge is parallel to the side edge of the signal line 4. Although two protrusions are provided in the LCD device shown in FIG. 5, it is possible to provide only one protrusion (or indentation). Even in such case, the above state easily occurs, because there are formed, between the pair of side edges defining the width of the signal line 4, two edges of the a-Si layer protrusion (or indentation) that are parallel to the pair of side edges.

Figure 6:
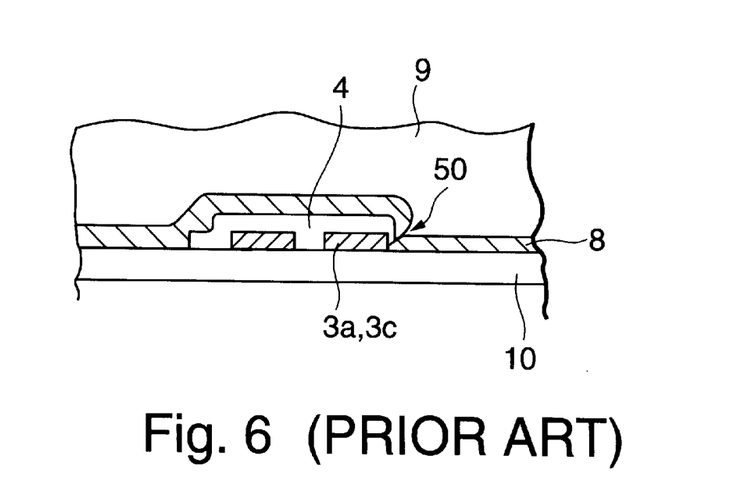
FIG. 6 is a cross-sectional view along the line A—A of FIG. 5 in case where the edge of a semiconductor layer (3a and 3b) and the edge of a wiring layer 4 are brought into a substantially over lapping state.

FIG. 6 illustrates a sectional view along the line A—A of FIG. 5 in the case where the signal line 4 has been actually formed with the leftward deviation from the designed center position. As is apparent therefrom, by the side edge of the signal line 4 almost overlapping with the side edge of the a-Si protrusion layer, there is formed a sharp and relatively high step 50 at their overlapping portion. It is noted that the reference numeral 10 indicates the gate insulating film. In order to complete the LCD device, the protective layer 8 and an orientation layer (not shown) are there after formed, followed by injecting a liquid crystal layer 9. It is hard to completely cover the above step 50 with the protective and orientation layers, so that some cracks are left in the portions of these layers corresponding to the step 50. The liquid crystal is thereby in contact with the signal line 4. Upon operation under such condition, such an electrochemical reaction occurs that the reacted metals flowing to the liquid crystal layer 9. As a result, the display uniformity is deteriorated and/or some displays stains are made.

It will be understood that the above problems may occur also in the LCD device in which the upper wiring layer such as a signal line is not so small in width as being not required to have high aperture ratio, because the phenomenon causing the above problems is dependent on the pattern deviation amount and/or the number or size of the a-Si protrusions (or indentations).

The crossing structures of the upper-level and lower-level patterns exist in a LCD device of the in-plane switching (IPS) type. If the resistance value of the liquid crystal is low that the electric chemical reaction occurs easily. Then, the LCD device of the IPS type generally uses the liquid crystal of the lower resistance value than the LCD device of the TN type. Accordingly, the above problems of the LCD device of the IPS type are serious problems more than the LCD device of the TN type.

SUMMARY OF THE INVENTION

It is therefore an object of the present invention to provide a more improved liquid crystal display device.

It is another object of the present invention to provide a liquid crystal display device having an improved crossing structure between an lower-level pattern and an upper-level pattern.

It is still another object of the present invention to provide a liquid crystal display device having such a structure that prevents the breaking-down of an upper-level pattern that may occur at the crossing portion thereof to a lower-level pattern and that further solves a problem that the lower-level and upper-level patterns overlap with each other in the different direction.

A liquid crystal display device according to the present invention includes a lower-level pattern and an upper-level pattern that crosses the lower-level pattern and has its width defined by a pair of side edges, so that such crossing structure has two, first and second, crossing points. At the first crossing point, one the pair of side edges of the upper-level pattern crosses a certain edge of the lower-level pattern, and at the second crossing point the other of the pair of side edges crosses the same edge of the lower-level pattern. Moreover, the above edge of the lower-level pattern having the first and second crossing points is formed such that a first extension line extending from the first crossing point in the widthwise direction of the upper-level pattern does not overlap with a second extension line extending from the second crossing point in the widthwise direction of the upper-level pattern.

In the above construction, the edge of the lower-level pattern that crosses the upper-level pattern is formed or patterned to have the first crossing point as a beginning point and the second crossing point as an ending point on the condition that the first extension line extending from the first crossing (the beginning) point does not overlap with the second extension line extending from the second crossing (the ending) point. In order to for the edge of the lower-level pattern to have such beginning and ending points, the edge line running from the beginning point can reach the ending point while bending twice between the beginning and ending points. In that case, if each of the bending angles is set to be a right angle, the edge of the lower-level pattern is composed of three line segments. This means that the central line segment becomes parallel to the side edges defining the width of the upper-level pattern, and the remaining two line segments cross the side edges of the upper-level pattern to constitute the first and second crossing points, respectively. Thus, it becomes possible that the lower-level pattern has only one line segment that is in parallel to the pairs of side edges defining the width of the upper-level pattern.

On the other hand, in the LCD device shown in FIG. 5, the pattern of the edge of the lower-level pattern (the a-Si layer 3) crossing the upper-level pattern (the signal line 4) is defined such that two crossing points, at which the pair of side edges defining the width of the upper-level pattern intersecting the edge of the lower-level pattern, has the same Y-coordinates as each other. In other words, the extension line extending form the first crossing point in the widthwise direction of the upper-level pattern overlaps with the extension line extending from the second crossing point in the widthwise direction of upper-level pattern. For this reason, the provision of the at least one protrusion (or indentation) of the lower-level pattern results in formation of two line segments at minimum in the edge of the lower-level pattern, which are in parallel to the side edges defining the width of the upper-level pattern.

In the present invention, it is possible to form the lower-level pattern with such an edge that has only one line segment which is in parallel to the side edges of the upper-level pattern. Accordingly, even if the pattern deviation (mask alignment deviation) occurs during the formation of the upper-level pattern to shift the location thereof, the upper-level pattern can be free from such situation wherein the one of the side edges of the upper-level pattern overlaps with such an edge of the lower-level pattern that is in parallel to the side edges of the upper-level pattern. Moreover, the edge of the lower-level pattern, which crosses the upper-level pattern, consists of three line segments in the above description, so that the breaking-down of the upper-level pattern can be also prevented.

In the crossing structure according to another scope of the present invention, the lower-level pattern is formed or patterned to have its edge that includes a first portion extending in a first direction intersecting a second direction in which an upper-level pattern runs, a second portion extending in the first direction but being different in position in the second direction from the first portion, and a third portion exiting between the first and second portions to form the connection between the first and second portions, and the upper-level pattern if formed such a pair of side edges defining the width thereof cross the first and second portions of the edge of the lower-level pattern, respectively.

The present invention is preferably applied to an LCD device of the active type, in which a plurality of TFTs are arranged in matrix to drive an corresponding one liquid crystal cells (pixels). In that case, the crossing structure according to the present invention is used in each of the crossing portions of scan and signal lines. In particular, in case of using the TFT of the inverted staggered type, the lower-level pattern is an island semiconductor layer and the upper-level pattern is a signal (data ) lines. As a display mode, which of the twisted nematic (TN) mode, the IPS mode, a vertical alignment (VA) mode, or any mode may be applied.

BRIEF DESCRIPTION OF THE DRAWINGS

The above and other objects, advantages and features of the present invention will be more apparent from the following description taken in conjunction with the accompanying drawings, in which:

FIG. 1b is a cross-sectional view along the line B—B of FIG. 1a;

DESCRIPTION OF THE PREFERRED EMBODIMENTS

The present invention will be described herein in detail with reference to illustrative embodiments. Those skilled in the art will recognize that many alternative embodiments can be accomplished using the teaching of the present invention and that the invention is not limited to the embodiments illustrated for explanatory purposes.

Figure 1A:
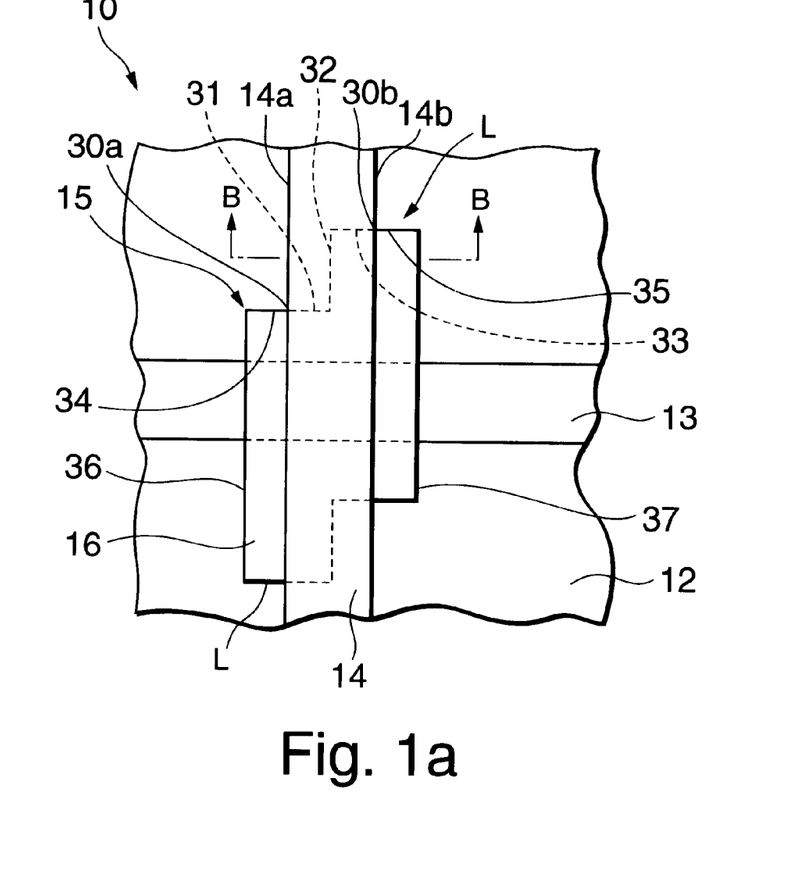
FIG. 1a is a plane view illustrative of a part (in particular, a crossing portion of scan and signal lines) of an LCD device according to an embodiment of the present invention.
Figure 1B:
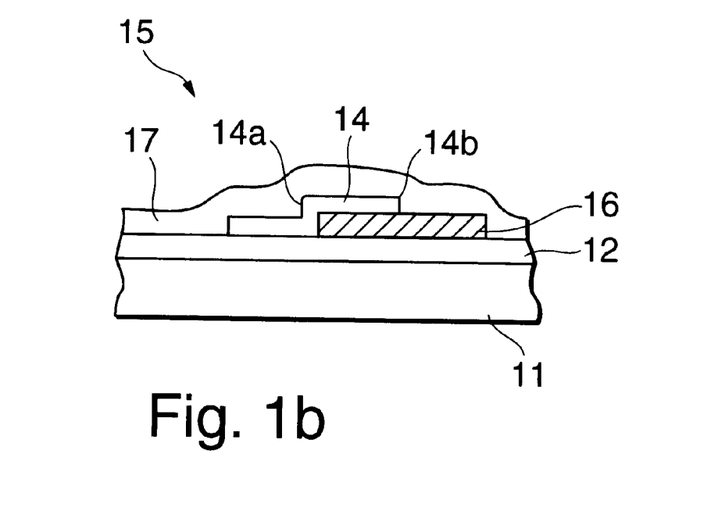

Referring now to FIGS. 1a and 1b, a liquid crystal display device 10 according to an embodiment of the present invention includes, as a base plate or substrate, a transparent substrate 11 such as a glass substrate. Although not shown, TFTs are arranged in matrix on the substrate 11 correspondingly to pixels disposed in a plurality of rows and columns. The respective gates electrodes of the TFTs arranged in the same row are connected to a correspond one of scan lines 13 (only one scan line is shown in the drawings), and the respective drain (or source) electrodes of the TFTs arranged in the same column are connected to a corresponding one signal (data) lines 14 (only one signal line is shown in the drawings). Each of these lines 13 and 14 are made of a conductive material such as Chromium (Cr), Aluminum (Al) and the like. Each TFT drives the associated liquid crystal pixel in the TN mode, in this embodiment. The IPS mode may be employed, instead.

Since the TFTs are arranged in matrix, the scan line 13 and the signal line 14 cross each other at a portion 15. In this crossing portions 15, as the TFT of the inverted staggered type is employed, the signal line 14 becomes an upper-level wiring layer or pattern. Particularly, the scan line 13, which is formed simultaneously with the gate electrode of each TFT on the substrate 11, is covered with a gate insulating film 12, on which the signal line 14 is formed simultaneously with the source and drain electrodes of each TFT. In order to prevent the short-circuit between the lines 13 and 14 caused by pinhole(s) in the gate insulating layer 12, an island semiconductor region 16, which is formed and patterned simultaneously with a semiconductor layer for the channel of each TFT, is formed at the crossing portion 15 to intervene between the scan and signal lines 13 and 14. The semiconductor region 16 is made of amorphous silicon in this embodiment. The entire surface of the substrate 11 including the TFTs, the pixel electrodes, the respective lines 13 and 14 as well as the crossing portion 15 are covered with a protective (passivation) layer 17 made of silicon nitride, for example.

While the semiconductor region 16 is formed to be made larger in area than the crossing portion 15 for the above purposes, its edges are patterned as described below in accordance with the present invention. With respect to the crossing edge line L of the semiconductor region 16 as a lower-level pattern to the signal line 14 as an upper-level pattern located on the upper side of the scan line 13, a pair of side edges 14a and 14b defining the width of the signal line 14 cross the edge line L of the semiconductor region 16 at first and second points 30a and 30b, respectively. As is shown in drawing, it is appreciated that the first and second points 30a and 30b are different in Y-coordinate from each other. Moreover, the edge line L is patterned to have three line segments 31 to 33, thereby passing through the first and second points 30a and 30b. More specifically, the edge line L of the semiconductor region 16 consists of the first line segment 31 which extends from the crossing point 30a in the widthwise direction of the signal line 14 (i.e., in the X-axis direction) up to the center point of the signal line 14, the second line segment 32 which bends upwardly at right angle at the terminated point of the first line segment 31 and extends up to the Y-coordinate of the crossing point 30b in parallel to the line edges 14a and 14b of the signal line 14, and the third line segment 33 extends from the terminated point of the second line segment 32 up to the crossing point 30b. The line segments 31 and 33 are thus almost equal in length to each other. With this configuration, the effective crossing length of the signal line 14 and the semiconductor region 16 is made large, so that the breaking-down of the signal line 14 due to the soaking of the etchant for the line 14 along the edge line L is prevented. It is to be noted that each of the semiconductor region 16 and the signal line 14 is depicted as a mask pattern to show the relative relationship between the semiconductor region 16 and the signal line 14 in the designed center position/value. Accordingly, it is ordinal that the region 16 and the line 14 are actually formed with some deviation in up-and-down and/or in left-and-right from the designed center position/value. In addition, the corner of the segments 31 and 32 and that of the segments 32 and 33 are actually formed with some round.

Since the crossing points 30a and 30b are set as described above, the number of the edge line segments of the semiconductor region 16, which are in parallel to the edge lines 14a and 14b of the signal line 14, can be restricted to only one as is denoted by the reference numeral 32. Therefore, this edge line segment 32 can be provided, on a mask, at the center of the width of the signal line 14. As a result, the distance between the segment 32 and the side edge 14a and that between the segment 32 and the side edge 14b can be made substantively larger than the prior art LCD device. In this embodiment, the segments 31 and 33 are extended respectively from the crossing points 30a and 30b with the same distance as that of each of the segments 31 and 33, as denoted by the reference numerals 34 and 35, and intersect respectively with side edges 36 and 37 which define the width of the semiconductor region 16. One of or both of the edge line segments 34 and 35 may be larger in length than each of the edge line segments 31 and 33.

Similar designs to the above are made on the edge line of the semiconductor region 16 on the lower side with respect to the signal line 14.

Thus, both of the side edges 14a and 14b of the signal line 14 are free from overlapping with the line segments 32, 36 and 37 of the semiconductor region 16 that are in parallel to the side edges 14a and 14b of the signal line 14 even if the deviation occurs in mask alignment between the semiconductor region 16 and the signal line 14. As a result, the protective layer 17 can cover the edges of the respective patterns such as the signal line 14 and the semiconductor region 16 with sufficient thickness, as shown in FIG. 1b, to thereby prevent the occurrence of defects such as crack in the layer 17. The liquid crystal layer, which is not shown in the drawing but is provided above the entire surface of the protective layer 17 through an orientation film (also not shown) is free from being in direct contact with the signal line 14. In other words, the materials of the signal line 14 is prevented from diffusing into the liquid crystal layer.

As a result of the inventors' investigation, there has been observed no cracks in the protective layer 17 in case where each of the side edges 14a and 14b of the signal line 14 is at an actual distance of at least 0.3 to 0.4 μm from the edge segments such as 32, 36 and 37 of the semiconductor region 16, even if the thickness of the layer 17 and/or manufacturing conditions are somewhat changed. Each of the semiconductor layer 16 and the signal line 14 is usually formed by aligning its formation mask with a reference mark which has been formed in the step of forming the scan line 13, the deviation in the respective mask alignment is about 0.8 μm at most. The actual width of each of the semiconductor region 16 and the signal line 14 on the LCD device is changed from its design value by about 0.8 μm at most. From the above, the deviation from the designed value caused by mask misalignment becomes about 0.8 μm at most. Accordingly, when the edge segment 32 is provided at the center of the width of the signal line 14 on the mask, each of the edge segments 31 and 33 is required to be a length-of at least 2.0 μm. The signal line 14 thus requires 4.0 μm width. While the width of the signal line 14 is determined by the required device characteristics such as aperture ratio, if 5.0 μm width is allowed for the signal line 14, the distance between the edge segment 32 and the side edge 14a or 14b at least has a margin of about 0.9 μm. In other words, it is most preferable to have the edge segment 32 position at the center of the width of the signal line 14; however, it is allowed to move or shift the edge segment 32 by slight distance in the left or right direction from the center of the signal line 14.

It has been found that the signal line 14 may be etched by the soaking etchant by about 1 to 2 μm from the crossing points 30a and 30b. Accordingly, when each of the edge line segments 31 and 33 is designed to be 2 μm in length, the etchant does not soak into the edge segment 32, thereby the breaking down of the signal line 14 being prevented. However, taking into account the resistance of the signal line 14 and so on, it is preferred to set the segment 32 to be at least 2 μm length. The difference between the Y-coordinates of the crossing points 30a and 30b is thus set to be 2 μm.

Figure 2A:
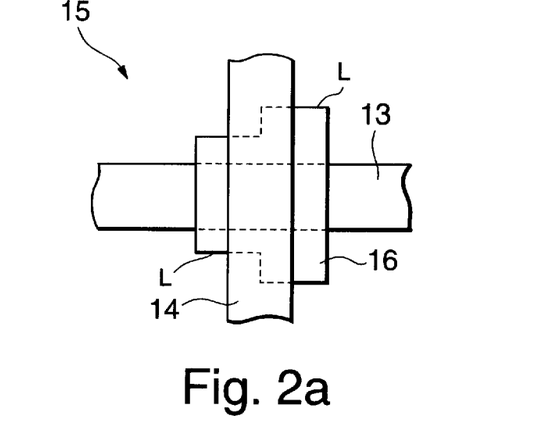
FIGS. 2a to 2f are plane views showing a part of LCD devices according to other embodiments of the present invention.
Figure 2B:
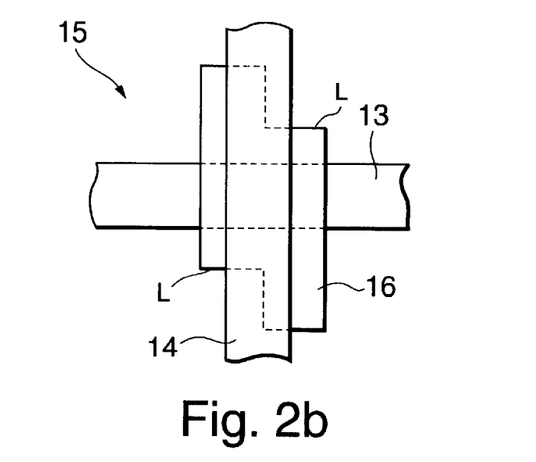
Figure 2C:
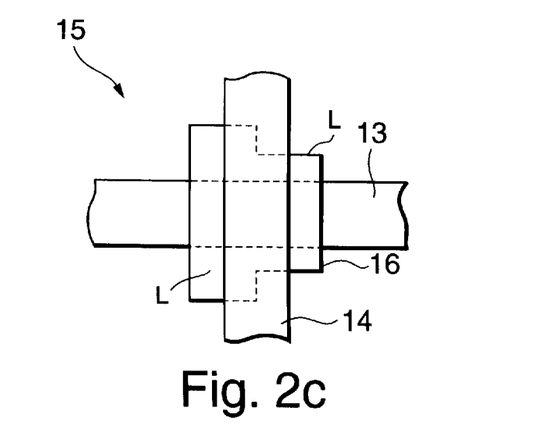
Figure 2D:
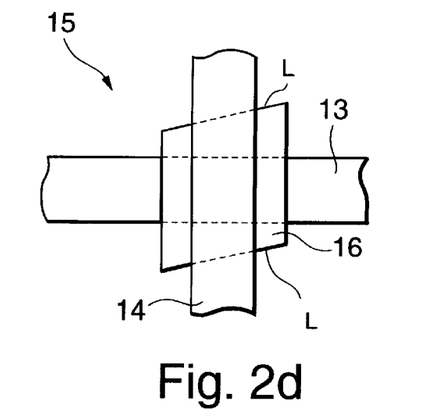
Figure 2E:
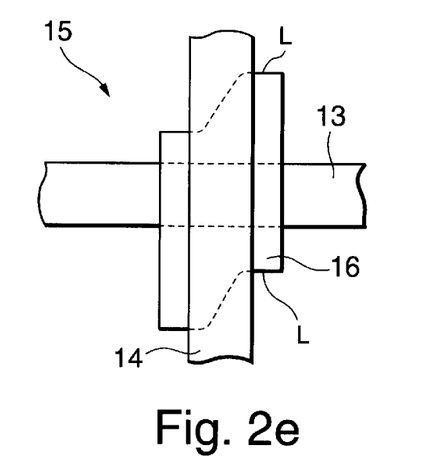
Figure 2F:
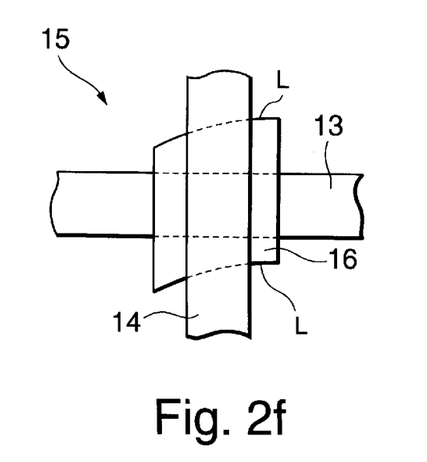

Referring now to FIGS. 2a to 2f, there are shown respective parts of the LCD devices according to other embodiments of the present invention, in which the same constituents as those shown in FIG. 1a are denoted by the same reference numerals to omit the further description thereof. In these drawings, various patterns for the semiconductor region 16 according to the present invention are shown. In FIGS. 2a to 2c, of the edge segments of the region 16, the one or two line segments, which are in parallel to the side edges 14a and 14b of the signal line 14, are different in its bending direction from that of the region 16 shown in FIG. 1a (i.e., the segment 32). In the semiconductor region 16 shown in each of FIGS. 2d to 2f, on the other hand, its edge line L is patterned not to be a bent line, but to be a slant line (FIG. 2d), an approximately S-shape line (FIG. 2e), or a curved line (FIG. 2f).

Figure 3:
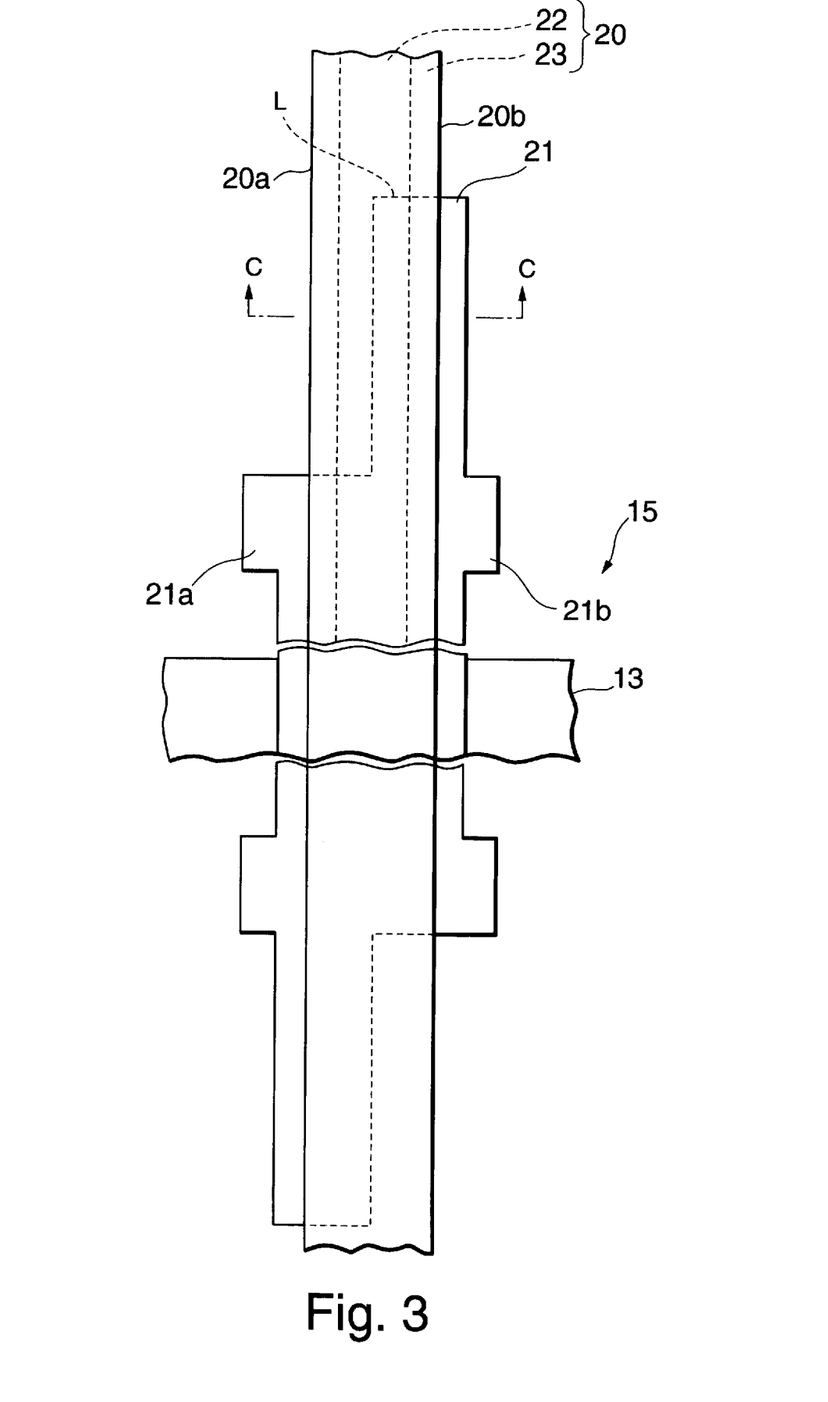
FIG. 3 is a plane view illustrative of a part (in particular, a crossing portion of scan and signal lines) of an LCD device according to a further embodiment of the present invention.

The description will be now made to the LCD device shown in FIGS. 3 and 4 as a further embodiment of the present invention. This device uses the so-called clad structure for a signal line 20. In addition, a semiconductor region 21 have a different pattern from that shown in FIG. 1. It is desirable to reduce the resistance of the signal line 14. As a metal having high conductivity, Aluminum (Al) is preferable. However, Al has some problems with alloy reaction with silicon, electro-migration and hillock formation. Therefore, the signal line 20 is formed with the clad structure in which an Al core layer 22 is surrounded by a coating layer 23 made of Chromium (Cr), for example.

In the formation of such line 20, a lower-level Cr layer and an Al layers are deposited in that order over the entire surface of the substrate, and the Al layer is then selectively etched away to the AL core layer 22. Thereafter, an upper-level Cr layer is deposited, followed by selective etching to form the Cr coating layer 23.

In this embodiment, the Al layer 22 is about 5 to 6 μm width and the Cr layer 23 is about 9 μm width. In the mask patterns, it is designed that the center line of the core layer 22 becomes coincident with the center line of the coating layer 23 and further with the edge segment 25 of the semiconductor region 21 which is in parallel to side edges 22a and 22b of the core layer 22 and to the side edges 23a and 23b of the coating layer 23. Therefore, no clack is induced in a protective layer covering the signal line 20, even when the deviation of some mask alignment occurs.

As discussed in detail above, the LCD device according to this invention can be free from drawbacks that the upper-level pattern is broken down and the undesired clacks are generated in the protective (passivation) layer.

It is apparent that the present invention is not limited to the above embodiments, but may be modified and changed without departing from the scope and spirit of the invention.

About the above disclosed explanation, the lower layer is explained as the gate line, but the common line may take the place of the gate line.

What is claimed is:

1. A liquid crystal display device comprising a lower-level pattern and an upper-level pattern crossing said lower-level pattern, said upper-level pattern having a pair of side edges defining a width of said upper-level pattern, said pair of side edges of said upper-level pattern thereby intersecting an edge of said lower-level pattern at first and second points, and said edge of said lower-level pattern being patterned such that a first extension line extending from said first point in a widthwise direction of said upper-level pattern does not overlap with a second extension line extending from said second point in said widthwise direction, wherein no edge of said lower level pattern forms a straight line passing through said first and second points.

2. The device as claimed in claim 1, wherein said lower-level pattern includes a semiconductor layer and said upper-level pattern includes a conductive wiring layer.

3. The device as claimed in claim 1, wherein said edge of said lower-level pattern includes first and second segments which are elongated respectively from said first and second points in said widthwise direction and a third segment which intervenes between said first and second segments.

4. The device as claimed in claim 3, wherein said third segment is substantially in parallel to a direction in which said upper-level pattern runs.

5. The device as claimed in claim 4, wherein said third segment positions approximately at a center of said upper-level pattern.

6. A liquid crystal display device comprising a lower-level pattern and an upper-level pattern crossing said lower-level pattern, said upper-level pattern having a pair of side edges defining a width of said upper-level pattern, said pair of side edges of said upper-level pattern thereby intersecting an edge of said lower-level pattern at first and second points, and said edge of said lower-level pattern being patterned such that a first extension line extending from said first point in a widthwise direction of said upper-level pattern does not overlap with a second extension line extending from said second point in said widthwise direction, wherein said upper-level pattern includes a wiring line having a core layer and a coating layer coating said core layer.

7. The device as claimed in claim 1, wherein said edge of said lower-level pattern has a curved shape passing through said first and second points.

8. The device as claimed in claim 1, wherein said edge of said lower-level pattern has an S-shape line passing through said first and second points.

9. A liquid crystal display device comprising a first pattern and a second pattern, said first pattern having its edge that includes a first portion which extends in a first direction intersecting a second direction in which said second pattern runs, and a second portion which extends in said first direction and is apart from said first portion in said second direction, said second pattern being arranged such that a pair of side edges defining a width of said second pattern cross respectively said first and second portions of the edge of said first pattern, wherein no edge of said first pattern forms a straight line passing through a first point corresponding to an intersection of said first portion and said second pattern and through a second point corresponding to an intersection of said second portion and said second pattern.

10. The device as claimed in claim 9, further comprising a liquid crystal cell and a driving element which drives said liquid crystal cell, said second pattern being elongated and connected to an electrode of said driving element.

11. The device as claimed in claim 10, wherein said driving element includes a semiconductor layer that is controlled by a voltage applied to said electrode through said second pattern, and said first pattern is an island semiconductor region that is apart from said semiconductor layer.

12. The device as claimed in claim 11, wherein said island semiconductor region has its edge defined by said first portion, said second portion and a third portion which connecting said first and second portions.

13. The device as claimed in claim 12, wherein each of said first and second portions is approximately in parallel to said first direction and said third portion is approximately in parallel to said second direction.

14. A liquid crystal display device comprising:
a pixel electrode,
a transistor having a first electrode connected to said pixel electrode, a second electrode and a third electrode,
a first wiring layer connected to said second electrode of said transistor and extending in a first direction,
a second wiring layer connected to said third electrode of said transistor and extending in a second direction intersecting said first direction, said second wiring layer crossing over said first wiring layer, and
an island region provided at a crossing portion of said first and second wiring layers to intervene between said first and second wiring layers, said island region having a first edge portion extending in said first direction, a second edge portion extending in said first direction and being different in a coordinate in said second direction from said first edge portion and a third edge portion extending in said second direction to connect said first and second edge portions, and
said second wiring layer crossing said island pattern such that a pair of side edges defining a width of said second wiring layer intersects respectively said first and second edge portions of said island region at first and second points, wherein no edges of said third edge portions extend in a straight line.

15. The device as claimed in claim 14, wherein said transistor includes as said second electrode a gate electrode and a gate insulating layer covering said gate electrode, said first wiring layer being connected to said gate electrode, and said second wiring layer supplying a data signal to said transistor, and said island region being made of semiconductor.

16. A liquid crystal display device comprising a pixel electrode, a transistor having a first electrode connected to said pixel electrode, a second electrode and a third electrode, a first wiring layer connected to said second electrode of said transistor and extending in a first direction, a second wiring layer connected to said third electrode of said transistor and extending in a second direction intersecting said first direction, said second wiring layer crossing over said first wiring layer, and an island region provided at a crossing portion of said first and second wiring layers to intervene between said first and second wiring layers, said island region having a first edge portion extending in said first direction, a second edge portion extending in said first direction and being different in a coordinate in said second direction from said first edge portion and a third edge portion extending in said second direction to connect said first and second edge portions, and said second wiring layer crossing said island pattern such that a pair of side edges defining a width of said second wiring layer intersects respectively said first and second edge portions of said island region at first and second points, wherein said transistor includes as said second electrode a gate electrode and a gate insulating layer covering said gate electrode, said first wiring layer being connected to said gate electrode, and said second wiring layer supplying a data signal to said transistor, and said island region being made of semiconductor and wherein one of a first distance between said first point and said third edge portion and a second distance between said second point and said third edge portion are at least 2 μm.

17. The device as claimed in claim 16, wherein the other of said first and second distances is at least 0.3 to 0.4 μm.

18. A liquid crystal display device comprising a pixel electrode, a transistor having a first electrode connected to said pixel electrode, a second electrode and a third electrode, a first wiring layer connected to said second electrode of said transistor and extending in a first direction, a second wiring layer connected to said third electrode of said transistor and extending in a second direction intersecting said first direction, said second wiring layer crossing over said first wiring layer, and an island region provided at a crossing portion of said first and second wiring layers to intervene between said first and second wiring layers, said island region having a first edge portion extending in said first direction, a second edge portion extending in said first direction and being different in a coordinate in said second direction from said first edge portion and a third edge portion extending in said second direction to connect said first and second edge portions, and said second wiring layer crossing said island pattern such that a pair of side edges defining a width of said second wiring layer intersects respectively said first and second edge portions of said island region at first and second points, wherein said third edge portion is at least 2 μm in length.

19. A liquid crystal display comprising:

a lower-level pattern and an upper-level pattern crossing said lower-level pattern, said upper-level pattern having a pair of side edges defining a width of said upper-level pattern, said pair of side edges of said upper-level pattern thereby intersecting an edge of said lower-level pattern at first and second points, and said edge of said lower-level pattern being patterned such that a first extension line extending from said first point in a widthwise direction of said upper-level pattern does not overlap with a second extension line extending from said second point in said widthwise direction, wherein-said edge of said lower-level pattern includes first and second segments which are elongated respectively from said first and second points in said widthwise direction and a third segment which intervenes between said first and second segments.

20. A liquid crystal display device comprising:

a lower-level pattern and an upper-level pattern crossing said lower-level pattern, said upper-level pattern having a pair of side edges defining a width of said upper-level pattern, said pair of side edges of said upper-level pattern thereby intersecting an edge of said lower-level pattern at first and second points, and said edge of said lower-level pattern being patterned such that a first extension line extending from said first point in a widthwise direction of said upper-level pattern does not overlap with a second extension line extending from said second point in said widthwise direction, wherein said edge of said lower-level pattern has an S-shape line passing through said first and second points.

* * * * *